United States Patent [19]

Kimura et al.

[11] 4,365,893
[45] Dec. 28, 1982

[54] SUPPORTING MECHANISM OF A DOCUMENT COVER LID FOR A COPYING APPARATUS

[75] Inventors: Hiroshi Kimura, Neyagawa; Masahiko Hisajima, Osaka; Yutaka Shigemura, Takarazuka; Yoichiro Irie, Suita, all of Japan

[73] Assignee: Mita Industrial Company Limited, Osaka, Japan

[21] Appl. No.: 218,013

[22] Filed: Dec. 18, 1980

[30] Foreign Application Priority Data

Dec. 21, 1979 [JP] Japan ................................ 54-167022

[51] Int. Cl.³ ............................................. G03B 27/62
[52] U.S. Cl. ........................................ 355/75; 16/332; 220/335
[58] Field of Search ...................... 355/25, 75, 82, 113, 355/128, 131, 133; 220/335; 16/332

[56] References Cited

U.S. PATENT DOCUMENTS

| | | | |
|---|---|---|---|
| 3,642,376 | 2/1972 | Halvorsen et al. | 355/75 |
| 4,110,041 | 8/1978 | Luperti et al. | 355/75 |
| 4,114,236 | 9/1978 | Vandervort | 220/335 |
| 4,124,296 | 11/1978 | Kishi et al. | 355/75 |

FOREIGN PATENT DOCUMENTS 939464 1/1974 Canada ................................. 16/332
958156 5/1964 United Kingdom ................. 16/332

Primary Examiner—L. T. Hix
Assistant Examiner—Alan Mathews
Attorney, Agent, or Firm—Wenderoth, Lind & Ponack

[57] ABSTRACT

A supporting mechanism of a document cover lid to be used for a copying apparatus includes a base of a supporting member mounted to the upper portion of an apparatus housing so as to swing about a horizontal axis. A positioning member is mounted on one of either the apparatus housing or the supporting member has a first frictional surface which is a circular periphery in a vertical plane with respect to the horizontal axis. A contact member is mounted on the other of either the apparatus housing or the supporting member and, has a second frictional surface, which is a circular periphery in a vertical plane with respect to the horizontal axis and is elastically pushed against the first frictional surface. By this mechanism, it is possible to support the document cover lid in an opened position upwardly at an angle sufficient to replace an original document.

8 Claims, 6 Drawing Figures

SUPPORTING MECHANISM OF A DOCUMENT COVER LID FOR A COPYING APPARATUS

BACKGROUND OF THE INVENTION

1. Field of the Invention

The present invention relates to a supporting mechanism for a document cover lid to be used for a copying apparatus, and more particularly to a supporting means capable of remaining the document cover lid in its fully raised position sufficient to allow the replacement of an original document on a transparent glass plate of the copying apparatus.

2. Description of the Prior Art

In a conventional typical copying apparatus, the replacement of an original document on a transparent glass plate is carried out by one hand while a document cover lid is raised above the plate surface by the other hand. Therefore raising or lowering of the document cover lid is very complicated. The larger is the copying apparatus, the heavier is the document cover lid. It is difficult to maintain the document cover lid in its fully raised position by one hand for replacement of the original document.

Accordingly, it is an object of the invention to provide an improved supporting mechanism for a document cover lid to be used for a copying apparatus.

It is an object of the invention to provide a supporting mechanism for a document cover lid to be used for a copying apparatus capable of supporting the document cover lid in an opened position extending upwardly at an angle sufficient to replace the original document.

SUMMARY OF THE INVENTION

To accomplish the foregoing objectives, there is provided an improved supporting mechanism for a document cover lid for a copying apparatus wherein a base of a supporting member is mounted to the upper portion of an apparatus housing so as to swing about a horizontal axis. A positioning member is mounted on one of either the apparatus housing or the supporting member and has a first frictional surface which is a circular periphery in a vertical plane with respect to the horizontal axis. A contact member is mounted on the other of either the apparatus housing or the supporting member and has a second frictional surface, which is a circular periphery in a vertical plane with respect to the horizontal axis and is elastically pushed against the first frictional surface. Therefore, it is possible to support the document cover lid in an opened position extending upwardly at an angle sufficient to enable replacement of the original document.

According to another aspect of the invention, the positioning member is mounted on the apparatus housing, and the contact portion between the first frictional surface and the second frictional surface is positioned lower than a horizontal line including the center of the first frictional surface of the positioning member when the document cover lid is in a closed position. According to further aspect of the invention, the contact member is mounted on the apparatus housing, and the contact portion between the first frictional surface and the second frictional surface is positioned lower than the horizontal line including the center of the second frictional surface of the contact member when the document cover lid is in a closed position. Therefore, the document cover lid depresses an original document onto a transparent plate when the document cover lid is closed.

BRIEF DESCRIPTION OF THE DRAWINGS

A detailed description of the invention will be made with reference to the accompanying drawings wherein like numerals designate corresponding parts in the various figures, and wherein.

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 1:
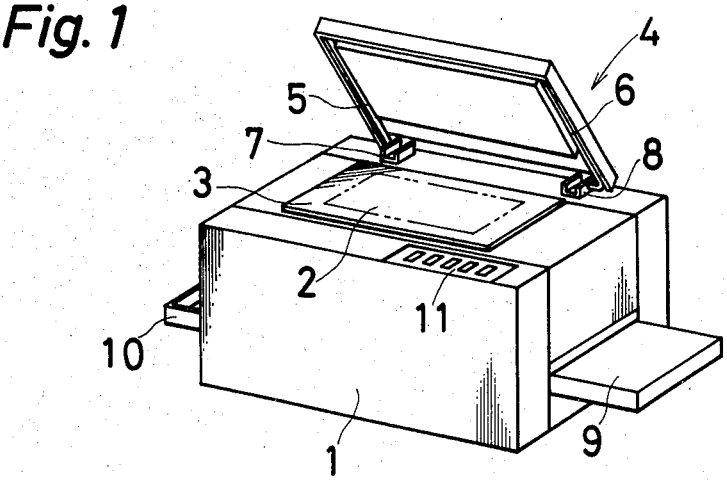
FIG. 1 is an overall perspective view of one preferred embodiment of the invention.

FIG. 1 is an overall perspective view of an embodiment of the invention. This electrostatic copying apparatus comprises an optical means (not shown) which is scanned horizontally in the lateral direction (right and left as viewed in FIG. 1) of an apparatus housing 1 for projecting an image of an original document 2 shown by phantom lines through a slit onto a moving photoconductive surface. A transparent glass plate 3 is mounted on the top surface of the apparatus housing 1 to allow the original document 2 to be placed thereon. A part of the aforementioned movable optical means is mounted beneath the transparent glass plate 3. The original document 2 on the transparent glass plate 3 is covered with a document cover lid 4 supported by supporting rods 5 and 6. The bases of the supporting rods 5 and 6 are pivotally mounted by means of hinge members 7 and 8 fixed to the rear end of the apparatus housing 1. Accordingly this side of the document cover lid 4, as viewed by the operator, is pivotally raised above the transparent glass plate 3 as shown in FIG. 1. A feeding cassette 9 stored with copy papers is detachably mounted to one side wall of the apparatus housing 1, and a copy collection tray 10 is also mounted to the other side wall so as to receive copy papers to be reproduced. An operating mechanism 11 is located on the upper front portion of the apparatus housing 1.

Figure 2:
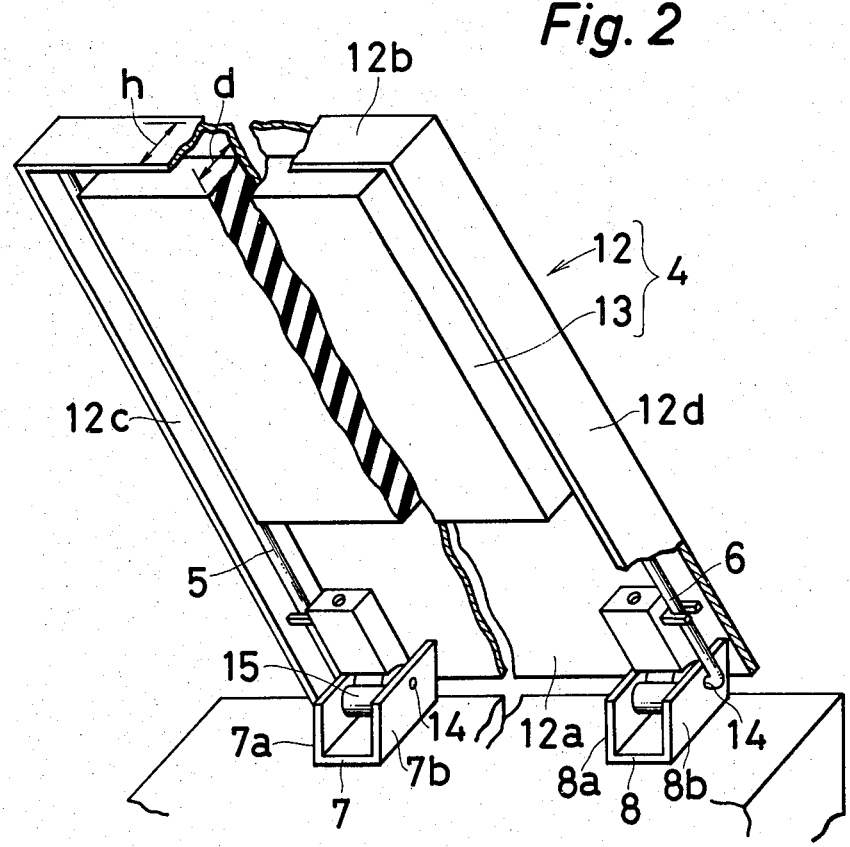
FIG. 2 is an enlarged perspective view in the vicinity of the document cover lid.
Figure 3:
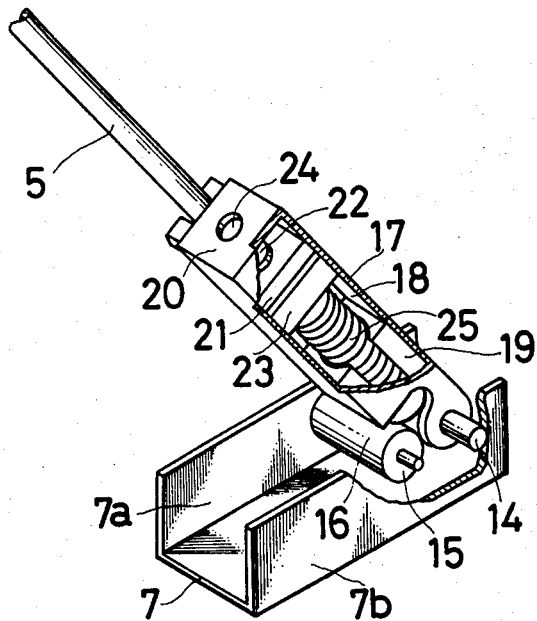
FIG. 3 is an enlarged perspective view in the vicinity of the base portion of the supporting rod, with parts broken away.

FIG. 2 is an enlarged perspective view in the vicinity of the document cover lid 4, and FIG. 3 is an enlarged perspective view in the vicinity of the base of the supporting rod 5, with parts broken away, showing further detailed of its construction. The document cover lid 4 comprises a frame 12 of rigid material and a retaining pad 13 manufactured of elastic material, such as polyurethane, which is adhered to the underside of the rigid frame 12 facing the transparent glass plate 3. The rigid frame 12 comprises a rectangular flat portion 12a, and three vertical walls 12b, 12c and 12d which do not cover the opening areas of the vicinity of the hinge members 7 and 8. The depth "d" of the retaining pad 13 is thicker than the height "h" of each wall 12b, 12c and 12d. Therefore, when the document cover lid 4 is pivoted downward to cover the original document 2 on the transparent glass plate 3, the retaining pad 13 substantially holds the original document 2 thereon.

Each of the hinge members 7 and 8 is formed in a U-shaped fashion having an area opening upwardly. Hinge members 7 and 8 have horizontal supporting shafts 14 pivotally mounted through respective supporting portions 7a and 7b, 8a and 8b. The supporting rods 5 and 6 extend along the insides of the walls 12c and 12d, and are fixedly mounted to the rigid frame 12. The bases of the supporting rods 5 and 6 are vertically fixed to the supporting shafts 14.

Figure 4:
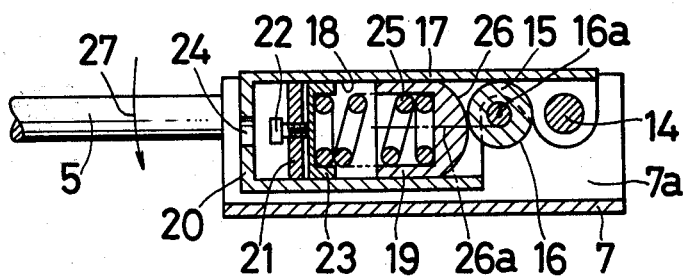
FIG. 4 is a cross sectional view in the vicinity of the base of the supporting rod when the document cover lid is in a closed position.

FIG. 4 is a cross sectional view in the vicinity of the base of the supporting rod 5 when the document cover lid 4 is in a closed position. A cylindrical positioning member 15, having an axis in parallel to that of the supporting shaft 14, is fixed to the hinge member 7. The peripheral surface of the positioning member 15 is first frictional surface 16.

A guide member 17 is fixedly mounted to the base of the supporting rod 5. The guide member 17 has a guide hole 18 formed in parallel alignment with the axis of the supporting rod 5. A contact member 19 to be in contact with the positioning member 15 is inserted in one side of the guide hole 18 facing the supporting shaft 14, and an end plate 20 occupies the other side. An supporting plate 21, provided with an adjustment screw 22 for fastening or loosening, is attached adjacent to the end plate 20 in the guide hole 18. A movable receiving plate 23 is adjustably disposed between the supporting plate 21 and the contact member 19 so as to be in contact with the adjustment screw 22 and in alignment with the guide hole 18. The end plate 20 has a hole 24 so that the adjustment screw 22 may be fastened or loosened through hole 24 by means of a driver. A spring 25 is provided between the receiving plate 23 and the contact member 19. Accordingly the contact member 19 is elastically pushed toward the supporting shaft 14 by the spring 25.

The contact member 19 has a second frictional surface 26 which is a half-circle end in a vertical plane with respect to an axis 16a of the positioning member 15 and is convex toward the supporting shaft 14. The positioning member 15 is placed so that the second frictional surface 26 of the contact member 19 always is in contact with the first frictional surface 16 of the positioning member 15 and can be elastically pushed toward the supporting shaft 14. When the document cover lid 4 is in a closed position as shown in FIG. 4, the mounting position of the positioning member 15 is determined so that the axis 26a of the second frictional surface 26 is lower than the axis 16a of the first frictional surface 16. Therefore, when the document cover lid 4 is closed, the first frictional surface 16 comes in contact with the second frictional surface 26 at a position which is lower than the axis of the positioning member 15 (refer to the axis 16a in this embodiment). Therefore the guide member 17 and the supporting rod 5 are provided with a downward force exerted by the spring 25 about the supporting shaft 14 as shown by an arrow 27. When the document cover lid 4 contacts the plate surface, the original document 2 can be substantially held on the transparent glass plate 3.

The base of another supporting rod 6 has the same construction as that of the supporting rod 5.

Figure 5:
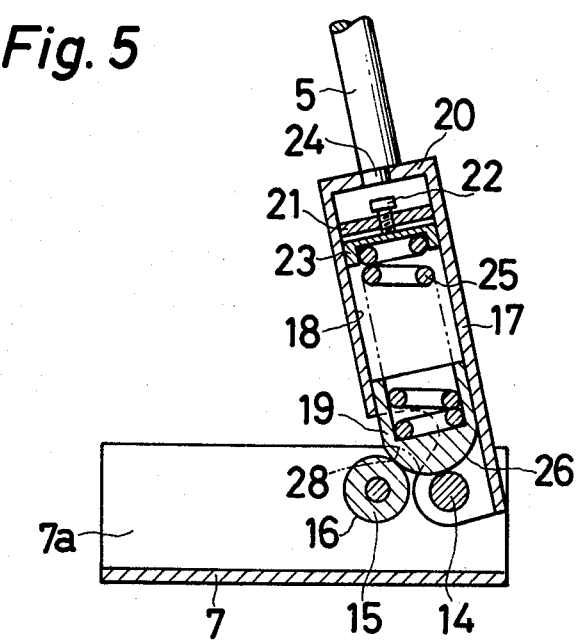
FIG. 5 is a cross sectional view in the vicinity of the base of the supporting rod when the document cover lid is in its fully raised position.

Referring to FIG. 5, when the document cover lid 4 is in its fully raised position, the contact member 19 comes in contact with the supporting shaft 14 and the positioning member 15. In this condition, since the contact member 19 is pushed by the force of the spring 25, the frictional force exerted between the first frictional surface 16 and the second frictional surface 26 is larger than the force due to the weight of the document cover lid 4 tending to close the cover lid 4. Therefore, even when the operator takes his hand off the document cover lid 4, will remain in the raised position as shown in FIG. 5. A hollow 28 (as shown by a phantom line) may be formed in member 19 at the contact area between the positioning member 15 and the contact member 19, and the positioning member 15 may engage with the hollow 28 so as to cause the document cover lid 4 substantially to be held in its raised position.

Figure 6:
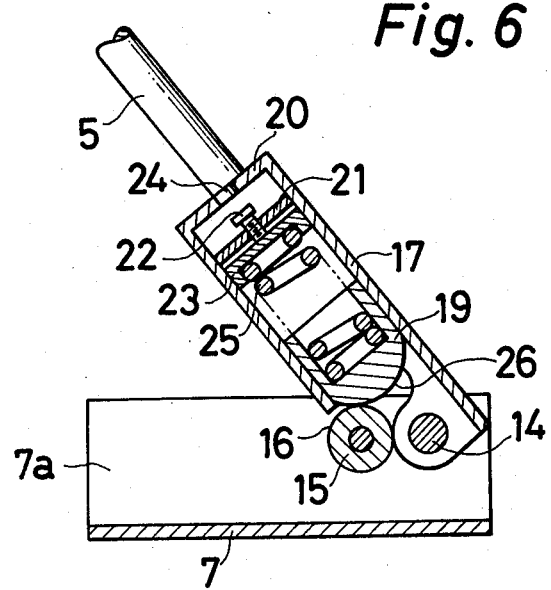
FIG. 6 is a cross sectional view in the vicinity of the base of the supporting rod when the document cover lid is moved slightly from its fully raised position as shown in FIG. 5.

Referring to FIG. 6, when the document cover lid 4 is slightly moved from its fully raised position as shown in FIG. 5, the contact member 19 still is maintained in contact with the positioning member 15. In this position, the force exerted by the spring 25 is determined so that the frictional force between the first frictional surface 16 and the second frictional surface 26 is larger than the force due to the weight of the document cover lid 4 tending to close the cover lid. Adjusting the adjustable screw 22 through the hole 24 with a driver allows the document cover lid 4 to be substantially raised in a desired position sufficient to allow the replacement of an original document on the transparent glass plate 3.

According to another aspect of the invention, the supporting rods 5 and 6 may be provided with the positioning member 15, and the hinge members 7 and 8 may be provided with the guide member 17, the spring 25 and the contact member 19.

What is claimed is:

1. A supporting mechanism for supporting a document cover lid of a copying apparatus of the type wherein the cover lid is movable between a lowered position covering an upper surface of the copying apparatus and a raised position uncovering the surface, said supporting mechanism comprising:

a support member adapted to be fixed to a cover lid and having a base;

means for mounting said base of said support member on an upper portion of a copying apparatus so that said support member is pivotally movable about a horizontal axis;

a positioning member adapted to be mounted on the upper portion of the copying apparatus, said positioning member having a cylindrical first friction surface formed by a peripheral surface of said positioning member, said peripheral surface being arranged coaxially about a center line of said positioning member extending parallel to said horizontal axis;

a contact member mounted on said support member and movable therewith, said contact member having a partially cylindrical second friction surface extending parallel to said horizontal axis;

means for biasing said contact member toward said positioning member such that said second friction surface is in contact constantly with said first friction surface; and said positioning and contact members being positioned and dimensioned such that, when said support member is pivoted about said horizontal axis to the lowered position of the cover lid, said first and second friction surfaces are in mutual contact at a position lower than a horizontal line extending transversely through said center line of said positioning member, and said biasing means and said contact member thereby create a force adapted to press the cover lid downwardly against the upper surface.

2. A mechanism as claimed in claim 1, wherein said horizontal axis comprises a rod adapted to be mounted on the upper portion of the copying apparatus, and, when said support member is pivoted to the raised position of the cover lid, said second friction surface is in contact with said first friction surface and said rod.

3. A mechanism as claimed in claim 1, further comprising a guide member mounted on said support member, said guide member having therein a guide hole, said contact member being slidably mounted in said guide hole, and said biasing means urging said contact member out of said guide hole toward said positioning member.

4. A mechanism as claimed in claim 3, wherein said biasing means comprises a spring, and further comprising means for adjusting the spring force of said spring and thereby the friction between said first and second friction surfaces.

5. In a copying apparatus of the type including an apparatus housing having an upper surface on which is positionable an original document to be copied, and a document cover lid supported on said housing for movement between a lowered position covering said upper surface and a raised position uncovering said upper surface, the improvement of a supporting mechanism for mounting and supporting said document cover lid on said housing, said mechanism comprising:

a support member fixed to said cover lid and having a base;

means for mounting said base of said support member on an upper portion of said housing so that said support member is pivotally movable about a horizontal axis between said lowered and raised positions of said cover lid;

a positioning member mounted on said upper portion of said housing, said positioning member having a cylindrical first friction surface formed by a peripheral surface of said positioning member, said peripheral surface being arranged coaxially about a center line of said positioning member extending parallel to said horizontal axis;

a contact member mounted on said support member and movable therewith, said contact member having a partially cylindrical second friction surface extending parallel to said horizontal axis;

means for biasing said contact member toward said positioning member such that said second friction surface is in contact constantly with said first friction surface; and said positioning and contact members being positioned and dimensioned such that, when said support member is pivoted about said horizontal axis to said lowered position of said cover lid, said first and second friction surfaces are in mutual contact at a position lower than a horizontal line extending transversely through said center line of said positioning member, and said biasing means and said contact member thereby create a force pressing said cover lid downwardly against said upper surface.

6. The improvement claimed in claim 5, wherein said horizontal axis comprises a rod mounted on said upper portion of said housing, and, when said support member is pivoted to said raised position of said cover lid, said second friction surface is in contact with said first friction surface and said rod.

7. The improvement claimed in claim 5, further comprising a guide member mounted on said support member, said guide member having therein a guide hole, said contact member being slidably mounted in said guide hole, and said biasing means urging said contact member out of said guide hole toward said positioning member.

8. The improvement claimed in claim 7, wherein said biasing means comprises a spring, and further comprising means for adjusting the spring force of said spring and thereby the friction between said first and second friction surfaces.

* * * * *